Feb. 3, 1925.
G. LI GOTTI
1,524,794
AUTOMATIC NUT CRACKING MACHINE
Filed March 20, 1923   2 Sheets-Sheet 1
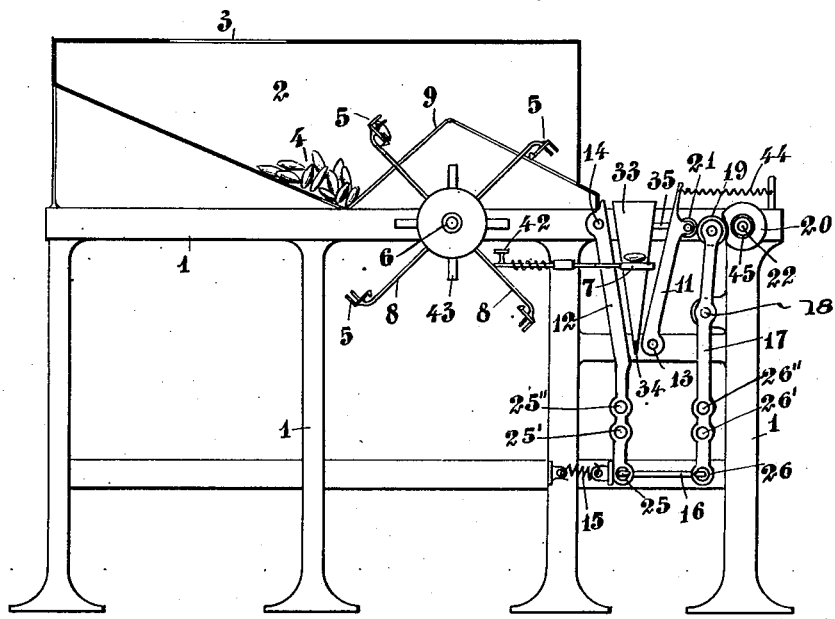
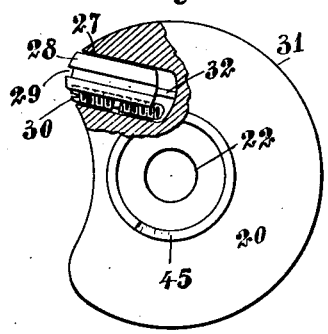
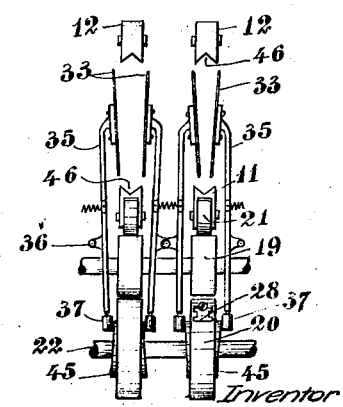
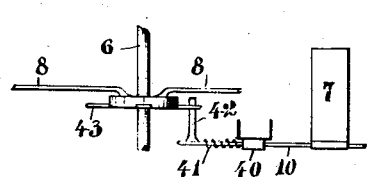

Feb. 3, 1925. 1,524,794
G. LI GOTTI
AUTOMATIC NUT CRACKING MACHINE
Filed March 20, 1923  2 Sheets-Sheet 2

Inventor
G. Li Gotti
by Langner, Parry, Card & Langner
Attys.

Patented Feb. 3, 1925.

1,524,794

UNITED STATES PATENT OFFICE.

GIUSEPPE LI GOTTI, OF ROME, ITALY.

AUTOMATIC NUT-CRACKING MACHINE.

Application filed March 20, 1923. Serial No. 626,349.

*To all whom it may concern:*

Be it known that I, GIUSEPPE LI GOTTI, manufacturer, a subject of the King of Italy, residing at Rome, in the Kingdom of Italy, have invented certain new and useful Improvements in Automatic Nut-Cracking Machines, of which the following is a specification.

This invention relates to improvements in automatic nut cracking machines of the type, in which hard shell seeds thrown in bulk into the machine are one after the other automatically brought under a crushing device that will break the shell, the machine preferably comprising a plurality of suitably arranged units which operate at different times during the same revolution of a driving shaft, whereby the crushing operation is practically continuous and is performed with a practically constant effort.

The machine is provided with a device designed to pick out the seeds one by one to be crushed and to convey them into the crushing device which, in this way, as in each unit of the machine, always has only one seed to operate on at a time.

The main feature of the machine consists in the crushing device, which is provided with adjusting means independent of the convergence of the jaws, whereby the ratio between the approaching movements of points situated at the same height on the two jaws can be varied within practically sufficient limits, the converging angle of the jaws being maintained unaltered.

A third feature consists in the fact that the interval during which the jaws draw nearer each other while pressing on the seed or nuts after having been brought in contact with it can be adjusted at will in order to adapt the machine to crush seeds of different kinds which require different treatment.

The machine hereunder described by way of example is chiefly designed for the mechanical crushing, in a continuous manner, of almonds and other hard shell seed of a flat shape which break in a different way according to whether they are pressed flatwise, i. e. against their convex faces, or edgewise i. e. against their edges. The machine comprises therefore as a fourth feature a device in which the almonds are always crushed edgewise, so that the kernel may not be damaged.

The machine may comprise a plurality of like units and each unit, in its turn, may be built in such a way that at every turn of the driving shaft, it may successively draw and crush successively more than one seed.

In the annexed drawing which schematically illustrates a machine embodying the above said features according to the invention:

Fig. 1 shows a longitudinal vertical section of the machine;

Fig. 2 shows a top view of two units of the nut cracker;

Fig. 3 shows, on an enlarged scale, the construction of an eccentric which controls the movement of the jaws of the nut cracker;

Fig. 4 is a detail view.

Figure 5:
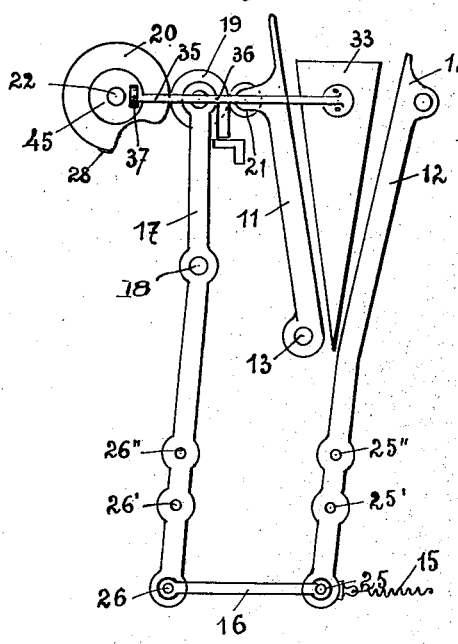
Fig. 5 represents in side elevation a view of the elements shown in Fig. 2.
Figure 6:
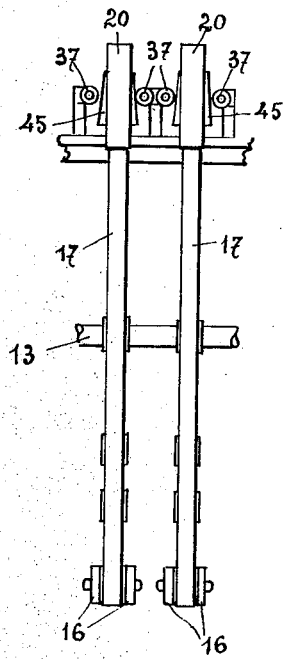
Fig. 6 is a view in front elevation of said elements.
Figure 7:
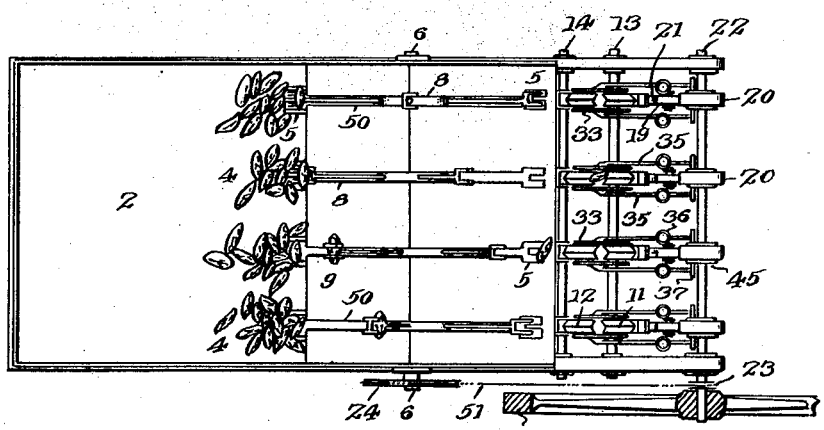
Fig. 7 is a top plan of the machine disclosed in Fig. 1.

As it is shown in the drawing, the machine consists of a supporting frame 1 which, on one side, on the left of the drawing, and at the top bears a set of hoppers 2 with feeding mouths 3 through which are introduced the seeds 4, which accumulate at the bottom.

The frame also carries a shaft 6 on which is mounted a chain wheel 24''.

In front of each hopper the shaft is provided with a number of radial arms 8, four according to the drawing, each arm ending in a toothed spoon 5.

Each group of radial arms with its feeding hopper, forms a selector and to the latter corresponds a nut cracker, which is on the opposite side of the machine, on the right hand of the drawing.

Whenever there are more selectors fitted on the same shaft the arms 8 are shifted from one selector to another, for the purpose of allowing the seeds drawn from the heap to reach under their respective cracking devices at different times. In this manner the shaft driving the group of nut crackers must develop only the force necessary for the crushing of one seed.

While the shaft 6 rotates, the radial arms 8 pass with their ends projecting through slits 50 between metal plate strips 9 bent into an angular shape, and on which strips are placed the seed that the arms draw from the heap 4.

The seeds, upon having been given up by arms 8 must fall into the corresponding nut crackers and in order to get them to fall in at the right time the following arrangement is adopted. The seeds given up by the arms 8 fall over a small trap-door 7 fastened upon a shaft 10 revolving in its supports 40 and kept, by a spring 41, in such position that, normally, the door 7 prevents the seed from falling. The shaft 10 has a side projection 42 against which strike small radial arms 43 mounted on the shaft 6. Every time one of said arms meets the projection 42 it causes the shaft 10 to rotate and allows the seed which is upon the door 7 to fall down. Upon falling through the door 7 the seed arrives between the two jaws 11 and 12 of the nut cracker proper which is arranged as follows.

The jaw 11 rocks on a pivot 13 and the jaw 12, which is longer, rocks on a pivot 14, both pivots 13 and 14 being fastened to the supporting frame.

The lower free end of the jaw 12 is continually pulled towards the left side by a spring 15 attached to the frame, while on the other side, by means of a link 16 it is connected to a two-armed lever 17 rocking around a pivot 18 and whose upper end carries a small roller 19. On roller 19 operates an eccentric 20, and roller 19, in turn acts against a roller 21 with which jaw 11 is provided on its back, the jaw being constantly urged towards the right side by a spring 44, so that both rollers 19 and 21 are permanently in contact with each other.

The shaft 22 carrying the eccentric is connected with the shaft 6 of the selector by means of a chain wheel 23 which is connected with the above said chain wheel 24 by the chain 51. On the shaft 22 is also mounted the fly-wheel 52 of the machine. In the case represented in the drawing the reduction ratio is such that, to each rotation of the shaft 6 corresponds four rotations of shaft 22, owing to the fact that the selector picks up a seed at every fourth of a turn, and hence at every fourth of a turn the nut cracker must therefore operate.

As may be clearly seen from Fig. 1 the connection between the two jaws 11, 12 and lever 17 is effected in such a way that no matter how big the seed is, and whatever may be the position wherein it stops between the two jaws, the closing movement of the latter through the action of the eccentric always has the same value. In fact it is apparent that at the top, where the bigger seeds stop, the narrowing action caused by the eccentric is wholly due to the movement of the jaw 11 which accomplishes it in full, while the opposite face of jaw 12 stands still, being in correspondence with the rocking pivot. In the lower part which is narrower and, where the smaller seeds stop, the face of jaw 11 remains still and the whole movement is accomplished by the jaw 12 due to the connection with lever 17. Furthermore both movements have the same extension, both the one in front of pin 14 and that opposite pin 13.

However in certain cases it might occur that the closing movement should be varied according to the size of the seed to be crushed, and, in order to provide for such need, the jaw 12 and the lever 17, besides the two lower eyes 25 and 26 respectively, bear other eyes 25′, 25″ and 26′, 26″ at different heights, allowing to vary the position of the link 16. It may also be seen that, the higher the link 16 is arranged, the smaller becomes the movement in correspondence with the pivot 13.

Besides this arrangement which refers to the alteration of the tightening action according to the size of the seeds of the same kind, another adjustment may be necessary on account of the fact that the seeds of different kinds require a tightening of a different value, and for this purpose means must be provided for regulating the eccentricity of eccentric 20. This adjustment may be effected in many different manners, one of which is shown by way of example in Fig. 3.

As is shown the eccentric 20 bears a straight recess 27 wherein may run a sliding block 28 with a rounded point. The sliding block is supplied with two grooves 29 wherein engage two ribs 32 of the recess 27 and by means of a screw-bolt 30 one half screwed in to the recess and one half in to the sliding block, the projection of the point outside the periphery of the eccentric is regulated at will.

The shape of the eccentric is such that, for the whole time during which the peripherical semi-circular part 31 passes against roller 19, the jaw remains still. It is then suddenly pushed forward upon the passage of the point of the sliding block 28 and then rapidly goes back.

To suitably guide the seeds when falling into the cracker, in such a way as to compel them to stop between the jaws, bearing against the latter with their lateral edges, on the sides of the two jaws, are provided rigid or yielding means which, if the seed is not already in the desired position, cause it during its fall to suitably rotate so as to place it with its plane of symmetry passing through the seam of the edges, normal to the sides of the jaws, and within a groove, in such a way that upon the tightening of the jaws the seed is crushed edge-wise.

In the embodiment shown in Figs. 1 and 2 the means designed to guide the seeds consist of two wedge-shaped metal plates 33—33 arranged between the two jaws 11—12 with their vertex situated below, where said plates are so close to each other as to allow of a seed passing through only when placed flat-wise, that is with the edges turned towards the jaws 11—12. At the lower portion, that is at their vertex 34, the two plates 33 are stationary, but they may slightly swing around, thereby approaching and moving away from each other at the upper portion, owing to said plates being connected to two arms 35 rocking upon a pivot 36 and guided by means of a roller 37 with which their free end is provided, and which rides upon a circular rim 45 of a variable height, with which the two faces of the eccentric 20 are provided.

The movement of the shaft 22 and the shape of the rim 45 are such that, when a seed has fallen into the cracker and starts to enter the upper opening of the guides 33, the latter at the upper portion, are slightly moved away from each other and allow the seed to slide down between them, thereby compelling said seed to place itself edge-wise between the two jaws. The two jaws 11 and 12 are suitably shaped so as to each present a groove 46 at its inner side so that the seed engages with its edges within the two opposite grooves and upon the jaws being brought together they crush it edge-wise.

In the drawing, and in the preceding description, the parallel movement of the jaws has been shown as obtained by means of an auxiliary lever. Still it will be understood that it may be obtained in any other convenient way, as for instance, by the parallel approach of a movable jaw against a fixed one, and by the parallel movement of both jaws.

It will be also understood that the jaws may have either flat or concave faces, either smooth or corrugated, according to circumstances, and that the several parts of the machine, the selector, the eccentric, the guiding plates, etc., will in each case be suitably shaped so as to meet the requirements of the special material to be crushed.

Claims:

1. In a continuously working automatic nut cracking machine, a crushing device comprising a long jaw and a short jaw each pivoted at one end, a lever pivoted off center, the long jaw being connected at its free end to the long arm of the lever, an eccentric, the short end of the lever terminating between the eccentric and the free end of the short jaw, whereby to afford means for approaching and successively withdrawing the jaws relation to each other in a uniform manner.

2. In a nut cracking machine according to claim 1, the free end of the long jaw extending beyond the short jaw and being provided with holes, corresponding holes provided in the long arm of the lever, a tie rod connecting up holes in the long jaw and the lever, in order to vary the ratio of movement of the jaws in respect of the two jaw pivots.

3. In a continuously working automatic nut cracking machine, crushing jaws, means for guiding nuts falling between the crushing jaws, such means comprising two sheet metal guiding jaws arranged between the crushing jaws and normal to their faces and designed to receive and to guide falling nuts, causing them to turn so as to bring them in a suitable position, and other means in combination with the first said means for causing the jaws guiding at times to separate from, and to approach each other, for the purpose of properly positioning the nuts to be cracked.

4. In an automatic nut cracking machine, an adjustable cracker device for picking out a single nut from a heap, adjustable cracker jaws arranged to move in parallel direction to each other, and to receive nuts from the selecting device, whereby to uniformly crush the nuts, regardless of their size, a guiding device in combination with the cracker jaws for positioning the nuts with their edges toward the cracker jaws, the cracker jaws, on their inner faces, having longitudinal grooves for receiving the edges of the nuts.

In testimony whereof I affix my signature in the presence of two subscribing witnesses, this 2nd day of March, 1923.

GIUSEPPE LI GOTTI.

Witnesses:
 JEFFERIS JABOCCETTE,
 WILHELM SCHMID.